(12) United States Patent  
Mase, Jr.

(10) Patent No.: US 6,471,148 B1
(45) Date of Patent: Oct. 29, 2002

(54) METHOD AND APPARATUS FOR CRUSHING GLASS

(75) Inventor: John Russell Mase, Jr., Austin, TX (US)

(73) Assignee: Paisano Industries, L.P., Austin, TX (US)

( * ) Notice: Subject to any disclaimer, the term of this patent is extended or adjusted under 35 U.S.C. 154(b) by 26 days.

(21) Appl. No.: 09/698,302

(22) Filed: Oct. 27, 2000

(51) Int. Cl.$^7$ .............................................. B02C 19/14
(52) U.S. Cl. .................. 241/24.3; 241/99; 241/178; 241/180; 241/299
(58) Field of Search .................. 241/72, 180, 99, 241/299, 171, 176, 177, 178, 30, 24.3

(56) References Cited

U.S. PATENT DOCUMENTS

| | | | |
|---|---|---|---|
| 2,098,054 A | * 11/1937 | McBerty | |
| 2,160,169 A | * 5/1939 | Pontoppidan | |
| 2,797,051 A | * 6/1957 | Pierson | |
| 4,069,979 A | 1/1978 | Morita et al. | 241/5 |
| 4,083,776 A | 4/1978 | Shimoiizaka et al. | 209/452 |
| 4,084,751 A | 4/1978 | Galis | 241/25 |
| 4,084,755 A | 4/1978 | Shimoiizaka et al. | 241/95 |
| 4,136,832 A | 1/1979 | Morita et al. | 241/91 |
| 4,265,408 A | * 5/1981 | Voelskow | 241/167 |
| 4,282,020 A | 8/1981 | Wheaton | 65/28 |
| 4,312,655 A | 1/1982 | Pack | 65/28 |
| 4,391,413 A | 7/1983 | Pack | 241/99 |
| 4,573,641 A | 3/1986 | DeWoolfson et al. | 241/36 |
| 5,207,572 A | 5/1993 | Deblock et al. | 432/58 |
| 5,350,120 A | 9/1994 | Melchionna | 241/5 |
| D355,289 S | 2/1995 | Schäfer | D34/1 |
| 5,524,837 A | 6/1996 | Raynes | 241/14 |
| 5,758,832 A | 6/1998 | Grainger | 241/19 |
| 5,875,979 A | * 3/1999 | Walters et al. | |
| 5,887,804 A | 3/1999 | Hansen | 241/24.3 |
| 5,950,936 A | 9/1999 | Bergart | 241/21 |
| 6,032,883 A | 3/2000 | Hansen | 241/24.3 |
| 6,039,277 A | 3/2000 | Hamm et al. | 241/189.1 |

\* cited by examiner

*Primary Examiner*—Mark Rosenbaum
(74) *Attorney, Agent, or Firm*—Henry L. Ehrlich; Winstead Sechrest & Minick P.C.

(57) ABSTRACT

A glass smasher is provided of the type for placement of glass articles for reduction to a particle size for reduced volumetric disposal and/or recycling purposes. Recycling may include reforming into another glass product or use as an aggregate. The glass smasher includes a rotatable barrel which may be divided into one or more internal chambers. At least a first chamber is formed having impacting means for breading and article into particles when the barrel is rotated. The first chamber may include free moving or floating smashing members such as ball bearings, bars or the like and/or attached impacting members. When an article of glass is placed in the first chamber and the barrel is rotated the article is broken into particles. These particles may be rotated and continued to impact the members until a desired particle size is achieved. Once a desired particle size is achieved in the first chamber the particles may be passed though a partition into a second chamber or out of the barrel into a collection collar or bin.

21 Claims, 2 Drawing Sheets

METHOD AND APPARATUS FOR CRUSHING GLASS

TECHNICAL FIELD

The present invention relates in general to crushing glass articles and in particular to crushing glass for subsequent recycling or for reduced disposal volume, and safety in disposal.

BACKGROUND

In recent years disposal and recycling of containers and waste products have become a national and worldwide concern. In particular, concern is addressed to the volume of land disposal area that is required to contain glass containers as well as other waste products. In reality many of these glass containers may be recycled or reused to form other products or used in products as an aggregate such as, but not limited to, paving materials.

Several states, municipalities, and conservation groups have promoted the recycling of glass products or the return of glass products for recycling. Some localities have mandated that glass products be submitted for recycling as opposed to disposal in a landfill. Unfortunately, as well intentioned as these mandates and requests may be, they do not address the inconvenience of localized storage and transport of glass products whether for disposal or recycling. Households very often have limited space and the occupants do not desire to store numerous glass articles for a weekly, bi-weekly, or less frequent pickup of recycle products. An additional problem with glass products is the risk of injury when the article is merely broken so as to reduce storage space.

Several devices have been utilized for separating glass products for recycling in commercial processes. Other systems have been utilized that reduce all material which is placed into the system into a fine mesh. However, heretofore there has not been an effective compact system that transforms glass products into cullet (broken or refuse glass). In particular, there has not been an efficient, cost effective manner for an individual or small group of people to convert waste glass products into a fine, polished cullet suitable for recycling and/or reducing the original product to a consistency suitable for conventional disposal and in a condition in which the cullet is substantially polished so as to reduce the risk of puncture or other injury to a person.

It would be a benefit therefor to have a method and apparatus for crushing glass that is suitable for household use. It would be a still further benefit to have a method and apparatus for crushing glass into a cullet for reducing the volume of the original glass product in a safe manner for disposal. It would be an additional benefit to have a method and apparatus for crushing glass products into a cullet that may be suitable for recycling or utilization as an aggregate in a product.

GENERAL DESCRIPTION

It is an object of the present invention to provide a compact unit for crushing glass articles to a degree suitable for reduced volume disposal.

It is a further object to provide a compact unit for crushing glass articles to a degree in which the glass particles are polished to reduce the risk of cutting or puncture to a person.

It is a still further object to provide a compact unit for crushing glass articles that is relatively inexpensive and efficient.

Accordingly, a glass smasher is provided of the type for placement of glass articles for reduction to a particle size for reduced volumetric disposal and/or recycling purposes. Recycling may include reforming into another glass product or use as an aggregate. The glass smasher includes a rotatable barrel which may be divided into one or more internal chambers. At least a first chamber is formed having means for impacting a glass article disposed within the first chamber when the barrel is rotated. The first chamber may include an impacting device connected to an interior service of the barrel chamber and/or free moving or floating smashing members such as ball bearings, bars or the like. When an article(s) of glass is placed in the first chamber and the barrel is rotated the article is broken into particles. These particles may be rotated and continued to impact the plates until a desired size is achieved. Once a desired size is achieved in the first chamber the particles may be passed though a partition into a second chamber or out of the barrel into a collection collar or bin.

It should be recognized that there may be numerous chambers formed within the barrel. Each chamber reducing the size of the particles and/or polishing off some of the sharper edges on the particles. Each chamber may include free moving smashing objects to crush the glass particles and/or sharding plates connected to the interior of the barrel.

It may be desired to include a filter system such as an air filtration system so as to reduce fine glass particulate which is atomized or disposed as dust. The filtration system may be connected in several locations singularly or in combination. For example a vacuum filtration system may be connected via a rotatable connector to one or both ends of the barrel. The filtration system may be connected to the particle collector collar or approximate the discharge of the particles into the container. It may additionally be desired to filter the atmosphere around the barrel which may be contained within a cover. This cover can also be used as an acoustical cover.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
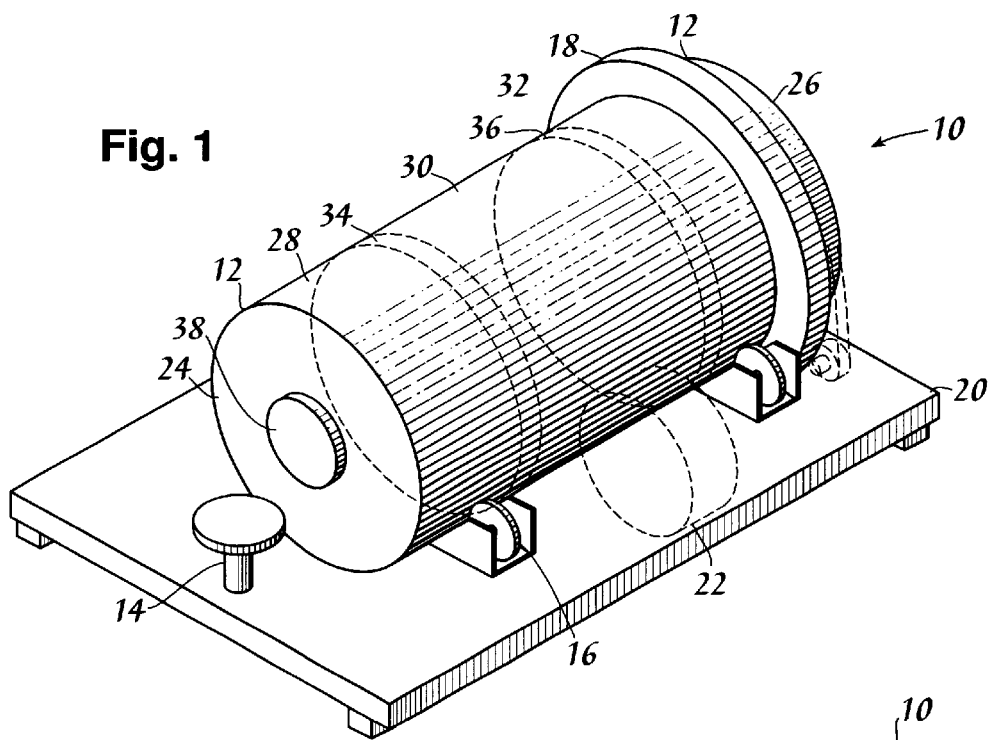
FIG. 1 is a perspective view of the glass smasher of the present invention.

Refer now to the drawings wherein depicted elements are not necessarily shown to scale and wherein like or similar elements are designated by the same reference numeral through the several views.

FIG. 1 is a perspective view of the glass smasher of the present invention generally designated by the numeral 10.

Glass smasher 10 includes a barrel 12, a barrel driving mechanism 22, a collection collar 18, thrust rollers 14, barrel rollers 16, and a base 20.

Barrel 12 is an elongated tube having first and second accessible, closed ends 24, 26. Barrel 12 may be divided into internal chambers by partitions. As shown in FIG. 1, barrel 12 is divided into three sections, a sharding chamber 28, rolling chamber 30, and a polishing chamber 32. Each chamber is separated by partitions 34 and 36. It should be recognized that barrel 10 of the present invention may be divided into more or fewer sections and may form a single chamber. At least a first securable access door 38 is provided on first barrel end 24 to allow introduction of a glass article into barrel 12.

Barrel 12 is rotatably disposed between drum rollers 16 and thrust rollers 14 to allow barrel 12 to rotate along its longitudinal axis. Rollers 14 and 16 are mounted atop a base 20. Base 20 may take many forms and may include wheels to facilitate mobility.

A barrel driving mechanism 22, such as an electric motor is functionally connected to barrel 12 to rotate barrel 12 about its longitudinal axis. As is obvious, many different methods of functionally connecting driving mechanism 22 with barrel 12 are possible. Additionally, various types of driving mechanisms 22, such as but not limited to electric motors, hydrocarbon powered engines, steam driven devices, and hand cranks, may be connected to barrel 12 so as to rotate barrel 12.

Although not shown in FIG. 1, an acoustic barrier in the form of a cover may be disposed around at least a portion of glass smasher 10. It is desirable for the acoustic barrier to include an access door to allow the disposal of glass articles into barrel 12.

Figure 2:
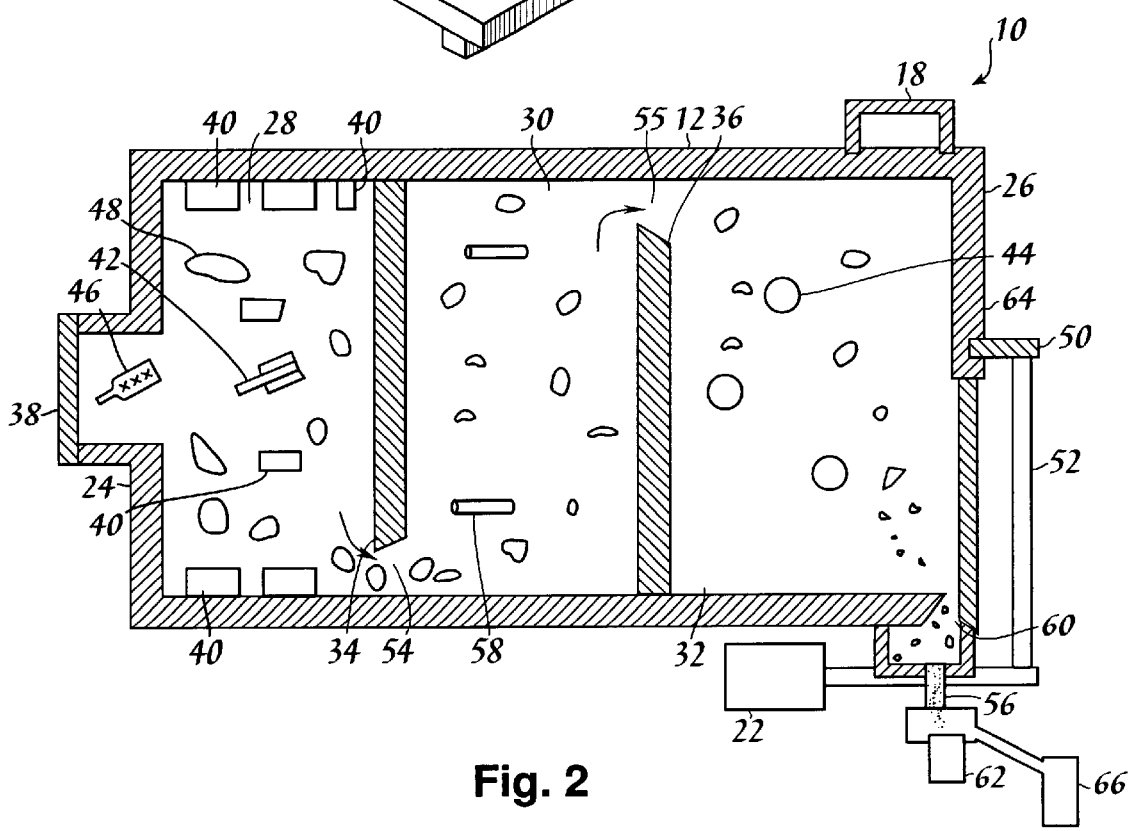
FIG. 2 is a partial, cross-sectional view of a portion of the glass smasher.

FIG. 2 is a partial, cross-sectional view of a portion of glass smasher 10 including barrel 12. As shown in the embodiment of FIG. 2, barrel 12 is divided into a sharding chamber 28, a rolling chamber 30, and a polishing chamber 32 by partitions 34 and 36. Barrel 12 includes a drive shaft 50 which is functionally connected by a belt 52 or the like to driving mechanism 22 so as to rotate barrel 12. Barrel 12 as shown is mounted atop barrel rollers 16 and between a thrust rollers 14. Rollers 14 and 16 not only allow barrel 12 to rotate and remain in position but may be utilized to provide friction to the rotation and aide in the reduction of a glass article 46 into glass particles 48.

Sharding chamber 28 includes at least one sharding plate 40 connected to the interior of barrel 12. Sharding plate 40 is an object formed of a material such as steel which will break glass objects. A free floating sharding plate 42 or an object such as a hard ball 44 may also be disposed in chamber 28. When a glass article 46, such as a bottle, is placed through first access door 38 into chamber 28 it rotates with barrel 12 and impacts against sharding plates 40 and breaks into particles 48. The addition of floating sharding plates 42 and/or balls 44 aide in the reduction of article 46 into particles 48 in a quicker manner.

As particles 48 are reduced in size they pass through at least one port 54 formed in partition 34. Port 54 is sized to allow a chosen maximum size particle 48 into chamber 30, the size of the maximum size determined by the size of port 54. Port 54 may be tapered from narrow to wide to aide in passage of particles 48 from chamber 28 to chamber 30. In addition, barrel 12 may be angled from horizontal or tapered to aide in the passage of particles 48 from one chamber to another and ultimately to the outlet 56.

Particles 48 pass through first partition 34 into rolling chamber 30 wherein the size of particles 48 is further reduced. Chamber 34 includes free floating weights 58 such as metal bars that rotate in chamber 34 as barrel 12 rotates. As free objects 58 rotate within chamber 30 they further crush particles 48 into a smaller size. Once particles 48 are crushed to a desired size they pass through at least one port 55 formed in partition 36 into chamber 32. Ports 54 in partition 36 are preferably of a smaller diameter of ports 54 formed through partition 34. Ports 54 through both partitions may be formed in similar fashions to aide in prevention of clogging as particles 48 pass through.

When particles 48 pass into chamber 32 they are further crushed to reduce sharp edges and may further reduce the size of particles 48. This polishing is accomplished by free floating smashing objects 44, such as ball bearings. As particles 48 are polished they exit through at least one outlet port 60 formed through barrel 12 into a collection collar 18. Collection collar 18 is a stationary member disposed about barrel 12 so as to encircle and enclose ports 60 as they rotate with barrel 12. Collar 18 may include a sealing element, not shown, to reduce glass particles and debris from passing between barrel 12 and collar 18. Particles 48 then pass through collar 18 to an outlet 56 into a container 62.

As shown, a filter system 66 is also connected at least to the outlet section of barrel 12, but may also be connected directly to barrel 12, collection collar 18, singularly or in combination. Filter system 66 may be one of many types of filter systems well known in the art for removing particulate from the atmosphere such as a system utilizing a HEPA filter. Filter system 66 is desired to reduce the very fine glass particles (cullet) which may be produced during the process.

As shown in FIG. 2 second barrel end 26 may include a rear access door to clean out chamber 30 if necessary. Another access door may be provided through either or both partitions 34 and 36 to allow for cleaning and/or placement of smashing objects.

Figures 3, 4:
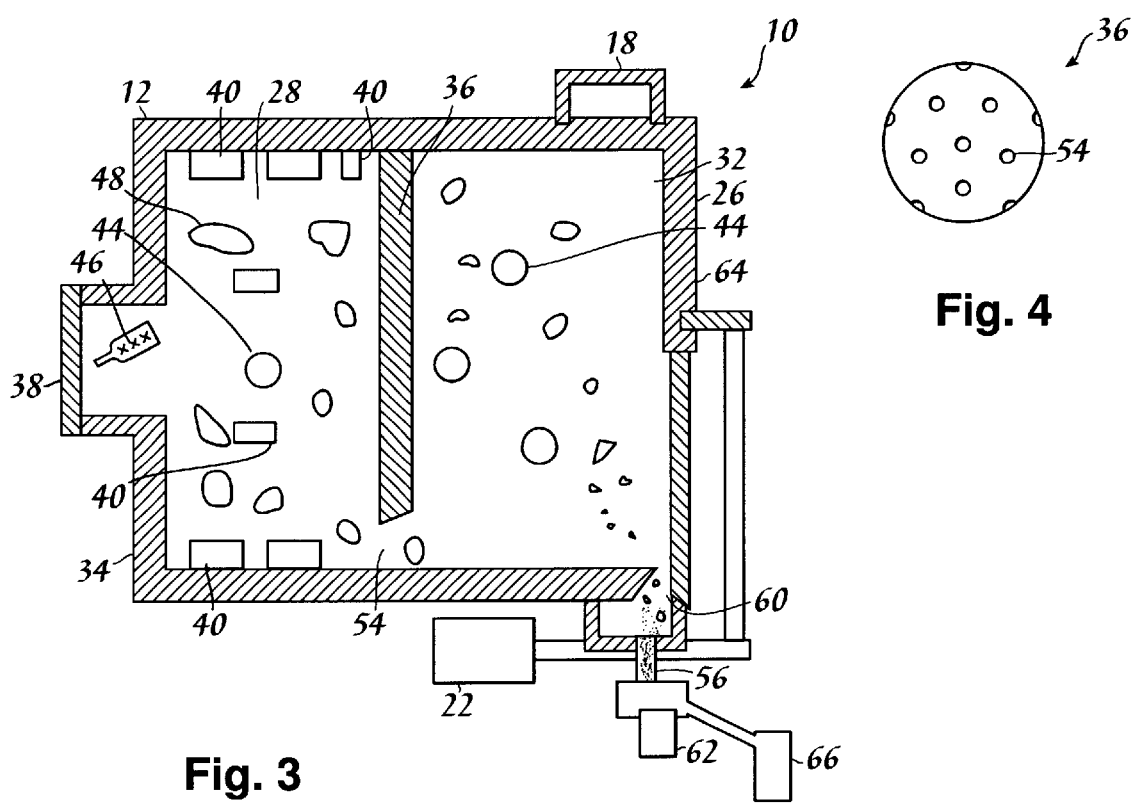
FIG. 3 is a partial, cross-sectional view of another embodiment of the glass smasher of the present invention.
FIG. 4 is a front, representative view of a partition utilized to divide the barrel into chambers.

FIG. 3 is a partial, cross-sectional view of another embodiment of the glass smasher 10 of the present invention. In this embodiment, barrel 12 is divided into two internal chambers 28 and 32 by apartition 36. Chamber 28 includes sharding plates 40 which are connected to the interior of barrel 12. Chamber 28 may further include free floating smashing objects 44 such as ball bearings or bars. A glass article 46 is placed into chamber 28 through access door 38 and barrel 12 is rotated. As barrel 18 rotates article 46 impacts sharding plates 40 and is broken into particles 48. As barrel 12 continues to rotate, particles 48 are further reduced in size. The reduction in size and polishing of particles 48 may be further facilitated by smashing objects 44 which freely rotate within chamber 28. Once the size of particles 48 are reduced to a desired size, they pass through at least one port 54 formed through partition 36.

Within chamber 32 particles 48 are further reduced in size and polished of most sharp edges by rotating with free moving smashing objects 44. As the particles are reduced to a size below a maximum size limit they pass through port 60 into collar 18 and through outlet 56 into a container 62 as cullet.

FIG. 4 is a front, representative view of a partition 36 utilized to divide barrel 12 into chambers. Partition 36 is representative of one configuration of any partition which may be utilized to divide barrel 12 into chambers. FIG. 4 shows a partition 36 having a plurality of ports 54. However, it should be recognized that any of the partitions may have one or more ports 54 and in varying configurations.

Although the present invention and its advantages have been described in detail, it should be understood that various changes, substitutions and alterations can be made herein without departing from the spirit and scope of the invention as defined by the appended claims. For example, varying the material of construction, angle of placement of the barrel, number of chambers, varying impacting and smashing devices, and number and size of ports for determining glass particle size for passage. It should be well recognized that the present invention may be expanded to accommodate varying quantities of glass articles and other articles for household or municipal use.

What is claimed is:

1. A glass smasher for reducing glass articles to particles, the glass smasher comprising:
    an enclosed barrel having an access port and a first closed end and a second closed end, said barrel forming at least one interior chamber;
    said first chamber having at least one sharding plate rigidly connected to an interior portion of said barrel for impacting a glass article disposed within said chamber, while said barrel is rotated;
    a driving mechanism functionally connected to said barrel in a manner to rotate said barrel; and
    at least one sized exit port formed through the circumference of said barrel to permit the passage of glass particles formed from the smashing of said glass article.

2. The glass smasher of claim 1, further including free moving smashing objects located within said interior chamber.

3. The glass smasher of claim 1, further including a collecting collar disposed about said barrel and adjacent said rotational path of said exit port for collecting said glass particles that pass therethrough and routing said glass particles to a collecting container.

4. The glass smasher of claim 3, further including free moving smashing objects located within said interior chamber.

5. The glass smasher of claim 3, further including a filter system for collecting fine glass particulate.

6. The glass smasher of claim 5, further including free moving smashing objects located within said interior chamber.

7. A glass smasher for reducing glass articles to particles, the glass smasher comprising:
    an enclosed barrel having an access port and a first closed end and a second closed end, said barrel forming at least a first and second interior chamber, said interior chambers being divided by a partition having at least one port formed therethrough for passing glass particles;
    said first chamber having at least one sharding plate rigidly connected to an interior portion of said barrel for impacting a glass article disposed within said chamber, when said barrel is rotated;
    said second chamber having fee moving smashing objects located therein;
    a driving mechanism functionally connected to said barrel in a manner to rotate said barrel;
    at least one sized exit port formed through the circumference of said barrel to permit the passage of glass particles formed from the smashing of said glass article; and
    a collecting collar disposed about said barrel and adjacent said rotational path of said exit port for collecting said glass particles that pass therethrough and routing said glass particles to a collecting container.

8. The glass smasher of claim 7, further including a filter for collection of fine glass particulate.

9. The glass smasher of claim 7, further including free moving smashing objects located within said first chamber.

10. The glass smasher of claim 9, further including a filter for collection of fine glass particulate.

11. A method for crushing glass articles into glass particles, the method comprising the steps of:
    placing a glass article into a first chamber of a barrel, said barrel having at least one sharding plate rigidly connected to an interior portion of said barrel;
    rotating said barrel in a manner such that said glass article impacts said sharding member and is reduced to glass particles; and
    passing said glass particles through a port formed through said barrel into a container.

12. The method of claim 11, further including a free moving smashing object disposed in said first chamber.

13. The method of claim 11, further including the step of filtering a portion of said system to remove fine glass particulate.

14. The method of claim 11, further including the step of passing said glass particles from said first chamber into a second chamber having a free moving smashing object disposed therein before exiting into said container.

15. The method of claim 14, further including the step of filtering a portion of said system to remove fine glass particulate.

16. The method of claim 11, further including the steps of:
    rotating at least one free moving smashing object within said first chamber;
    passing said glass particles through a partition into a second chamber defined by said barrel, said second chamber having at least one free moving smashing object disposed therein; and
    filtering a portion of said system to remove fine glass particulate.

17. A glass smasher for reducing glass articles to particles, the glass smasher comprising:
    an enclosed barrel having an access port and a first closed end, and a second closed end, said barrel forming at least one interior chamber;
    said first chamber having at least one sharding plate rigidly connected to an interior portion of said barrel for impacting a glass article disposed within said chamber, while said barrel is rotated;
    at least one free moving smashing object located within said interior chamber;
    a driving mechanism functionally connected to said barrel in a manner to rotate said barrel; and
    at least one sized exit port formed through the circumference of said barrel to permit the passage of glass particles formed from the smashing of said glass article.

18. The glass smasher of claim 17, further including a collecting collar disposed about said barrel and adjacent said rotational path of said exit port for collecting said glass particles that pass therethrough and routing said glass particles to a collecting container.

19. The glass smasher of claim 18, further including a filter system for collecting fine glass particulate.

20. The glass smasher of claim 17, further including a filter system for collecting fine glass particulate.

21. A glass smasher for reducing glass articles to particles, the glass smasher comprising:

an enclosed barrel having an access port and a first closed end and a second closed end, said barrel forming at least one interior chamber;

said first chamber having at least one sharding plate rigidly connected to an interior portion of said barrel for impacting a glass article disposed within said chamber, while said barrel is rotated;

at least one free moving smashing object located within said interior chamber;

a driving mechanism functionally connected to said barrel in a manner to rotate said barrel;

at least one sized exit port formed through the circumference of said barrel to permit the passage of glass particles formed from the smashing of said glass article; and a collecting collar disposed about said barrel and adjacent said rotational path of said exit port for collecting said glass particles that pass therethrough and routing said glass particles to a collecting container.

* * * * *